United States Patent
Cummings

(10) Patent No.: US 7,161,945 B1
(45) Date of Patent: Jan. 9, 2007

(54) CABLE MODEM TERMINATION SYSTEM

(75) Inventor: Scott Andrew Cummings, Suwanee, GA (US)

(73) Assignee: Broadcom Corporation, Irvine, CA (US)

(*) Notice: Subject to any disclaimer, the term of this patent is extended or adjusted under 35 U.S.C. 154(b) by 762 days.

(21) Appl. No.: 09/651,070

(22) Filed: Aug. 30, 2000

Related U.S. Application Data

(60) Provisional application No. 60/151,366, filed on Aug. 30, 1999, provisional application No. 60/151,365, filed on Aug. 30, 1999, provisional application No. 60/151,677, filed on Aug. 31, 1999.

(51) Int. Cl.
*H04L 12/50* (2006.01)

(52) U.S. Cl. ............. 370/401; 370/230.01; 370/235.1; 725/94

(58) Field of Classification Search ................ 370/235, 370/235.1, 230, 232, 233, 234, 411, 412, 370/413, 432, 435, 486, 516, 401, 230.1; 725/95, 111, 117, 118, 94
See application file for complete search history.

(56) References Cited

U.S. PATENT DOCUMENTS

| | | | | |
|---|---|---|---|---|
| 5,831,971 A * | 11/1998 | Bonomi et al. | ............ | 370/230 |
| 5,867,677 A * | 2/1999 | Tsukamoto | ................ | 710/316 |
| 6,011,775 A * | 1/2000 | Bonomi et al. | ............ | 370/230 |
| 6,243,360 B1 * | 6/2001 | Basilico | ........................ | 370/231 |
| 6,247,061 B1 * | 6/2001 | Douceur et al. | ........... | 709/240 |
| 6,292,489 B1 * | 9/2001 | Fukushima et al. | ......... | 370/401 |
| 6,304,578 B1 * | 10/2001 | Fluss | ........................... | 370/413 |
| 6,421,348 B1 * | 7/2002 | Gaudet et al. | .............. | 370/401 |
| 6,438,123 B1 * | 8/2002 | Chapman | .................... | 370/351 |
| 6,487,170 B1 * | 11/2002 | Chen et al. | ................. | 370/231 |
| 6,501,731 B1 * | 12/2002 | Chong et al. | ............ | 370/230.1 |
| 6,532,554 B1 * | 3/2003 | Kakadia | ..................... | 714/43 |
| 6,546,017 B1 * | 4/2003 | Khaunte | ..................... | 370/412 |
| 6,594,280 B1 * | 7/2003 | Chapman | .................... | 370/469 |
| 6,618,386 B1 * | 9/2003 | Liu et al. | .................... | 370/401 |
| 6,665,872 B1 * | 12/2003 | Krishnamurthy et al. | ..... | 725/95 |
| 6,678,248 B1 * | 1/2004 | Haddock et al. | ............ | 370/235 |
| 6,754,210 B1 * | 6/2004 | Ofek | .......................... | 370/389 |
| 6,798,743 B1 * | 9/2004 | Ma et al. | .................... | 370/235 |
| 6,816,457 B1 * | 11/2004 | Bahattab | ..................... | 370/232 |
| 6,865,151 B1 * | 3/2005 | Saunders | .................... | 370/230 |

FOREIGN PATENT DOCUMENTS

WO     WO 93/03564     2/1993

OTHER PUBLICATIONS

Mark Sumner: "DOCSIS 1.1 Overview" CABLEMODEM.COM—Documents, "Online! May 3-7, 1999, pp. 1-16, XP-002165493, http://www.cablemodem.com/Euroll_Overview.pdf, retrieved on Apr. 18, 2001.

(Continued)

*Primary Examiner*—Dorish H. To
*Assistant Examiner*—Streve Blount
(74) *Attorney, Agent, or Firm*—Squire, Sanders & Dempsey LLP

(57) ABSTRACT

A cable modem termination system including a media access controller, at least one physical layer transceiver in connection with the media access controller for receiving and transmitting data, a CPU interface configured to communicate with a CPU, and a network functions module in communication with the media access controller and the CPU interface. The network functions module is configured to conduct flow management and classification functions upon packets traveling through the media access controller.

39 Claims, 11 Drawing Sheets

OTHER PUBLICATIONS

Sdralia et al, "Performance Characterisation of the MCNS DOCSIS 1.0 CATV Protocol with Prioritised First come First Served Scheduling", IEEE Transactions on Broadcasting, US, vol. 45, No. 2, Jun. 1999, pp. 196-205.

Tzerefos et al, "Delivery of Low Bit Rate Isochronous Streams Over the DOCSIS 1.0 Cable Television Protocol", IEEE Transactions on Broadcasting, US, vol. 45, No. 2, Jun. 1999, pp. 206-214.

Li et al, "Time-Driven Priority Flow Control for Real-time Heterogeneous Internetworking", Proceedings of INFOCOM, US, Los Alamitos, IEEE Comp. Soc. Press, vol. Conf. 15, Mar. 24, 1996, pp. 189-197.

Ilvesmäki et al, "Flow Classification Schemes in Traffic-based Multilayer IP Switching—Comparison Between Conventional and Neural Approach", Computer Communications, GB, Butterworths & Co., Publishers Ltd., vol. 21, No. 13, Sep. 1, 1998, pp. 1184-1194.

A.D. Little, S. Lipoff: "Cable Modem Termination System—Network Side Interface Specification" Data Over Cable Interface Specification, Online 1996, pp. 1-17, XP002165494, http://www.cablemodem.com/SP_CMTS_NSII01-960702.pdf, retrieved on Apr. 18, 2001.

M. Laubach, "To foster residential area broadband internet techology: IP datagrams keep going, and going, and going . . . ", Computer Communications, NL, Elsevier Science Publishers BV, Amsterdam, vol. 19, No. 11, Sep. 1, 1996, pp. 867-875.

Goldberg, "MCNS/DOCSIS MAC Clears a Path for the Cable-Modem Invasion", Electronic Design, US, Penton Publishing, vol. 45, No. 27, Dec. 1, 1997, pp. 69-70, 74, 78, 80.

Quigley, "Cablemodem Standards for Advanced Quality of Service Deployments", Digest of Technical Papers, International Conference on Consumer Electronics, Jun. 22-24, 1999, pp. 282-283.

* cited by examiner

CABLE MODEM TERMINATION SYSTEM

REFERENCE TO RELATED APPLICATIONS

This application claims priority of U.S. Provisional Patent Application Ser. No. 60/151,677, filed on Aug. 31, 1999, U.S. Provisional Patent Application Ser. No. 60/151,366, filed on Aug. 30, 1999, and U.S. Provisional Patent Application Ser. No. 60/151,365, filed on Aug. 30, 1999. The contents of these previously filed applications are hereby incorporated by reference.

BACKGROUND OF THE INVENTION

1. Field of the Invention

The present invention generally relates to an apparatus and method for implementing flow management and packet classification in a Cable Modem Termination System (CMTS).

2. Description of the Related Art

The development of computer related technologies in recent years has fueled growth of the Internet. Internet users are now regularly using the Internet to browse news information, shop, make travel arrangements, communicate with other users via e-mail, and interactively communicate with other users via voice/video over Internet protocol applications, to name a few things. In the workplace, Internet connections are generally provided through a corporate data communications network, such as a LAN, that interfaces with a high speed Internet connection, such as a dedicated digital or T1 line. However, the vast majority of personal/home users of the Internet utilize modem connections to access the Internet through a public switched telephone network (PSTN) through their home telephone line. In this configuration, the PSTN provides a dedicated connection from the home personal computer (PC) to a server generally located on the premises of an Internet service provider. The PSTN connection, which is generally provided through a normal telephone line, is capable of transmitting data at rates ranging from 14,400 bps up to 56,000 bps, the maximum data throughput rate under current regulations for PSTN-type connections. Although the modem-type connection through a PSTN is generally available in most all areas, these types of connections suffer from bandwidth limitations, as current computing applications often require data throughput rates greater than 56,000 bps for effective operation.

In response to the bandwidth limitations of general modem connections, the industry is now turning to alternative methods of connecting to the Internet. A popular alternative to the general modem-type connection is the recently developed Cable Modem (CM) technology. This technology utilizes the cable television infrastructure to transmit and receive Internet related data from a home-computing source. In a typical configuration, a personal computer is equipped with a cable modem that interfaces with an existing coaxial or hybrid fiber/coaxial cable (HFC) used to provide cable television service to the home. This coaxial cable is then used to transmit both Internet and television signals to the home. Additionally, since the coaxial cable system is capable of data transfer rates of 30+ Mbps, a substantially greater bandwidth is available through these types of systems. Furthermore, since CM-type systems share a single coaxial cable for many users, the resources required to support the growing number of Internet users is decreased.

Notwithstanding the increase in bandwidth of cable modems, network congestion in a cable modem-type system is still a factor. In particular, when an Internet user is using latency sensitive applications, such as voice/video over IP applications, it is critical that data frames related to these types of software applications be routed through the data network ahead of regular data frames, as voice/video over IP (VoIP) data frames are more sensitive to data transmission delays that result from network congestion. Therefore, a need for a cable modem capable of traffic policing, rate shipping, and scheduling, all of which are commonly referred to as flow management, along with data classification capabilities, plainly exists.

SUMMARY OF THE INVENTION

The present invention provides a cable modem termination system including a media access controller, at least one physical layer transceiver in connection with the media access controller for receiving and transmitting data, a CPU interface configured to communicate with a CPU, and a network functions module in communication with the media access controller and the CPU interface. The network functions module is further configured to conduct flow management and classification functions upon packets traveling through the media access controller.

The present invention further provides a network functions module including at least one flow module, and at least one memory in communication with the at least one flow module. A bridging and routing module is provided and is in communication with the at least one flow module and the at least one memory. Further, the network functions module of the present invention is configured to implement flow control and quality of service functions on packets in a network.

The present invention additionally provides method for processing, wherein the method includes the steps of receiving a packet in a media access controller, transmitting the packet to a network functions module, implementing flow management and classification functions on the packet, and forwarding the packet to an appropriate destination.

DETAILED DESCRIPTION OF THE INVENTION

Figure 1:
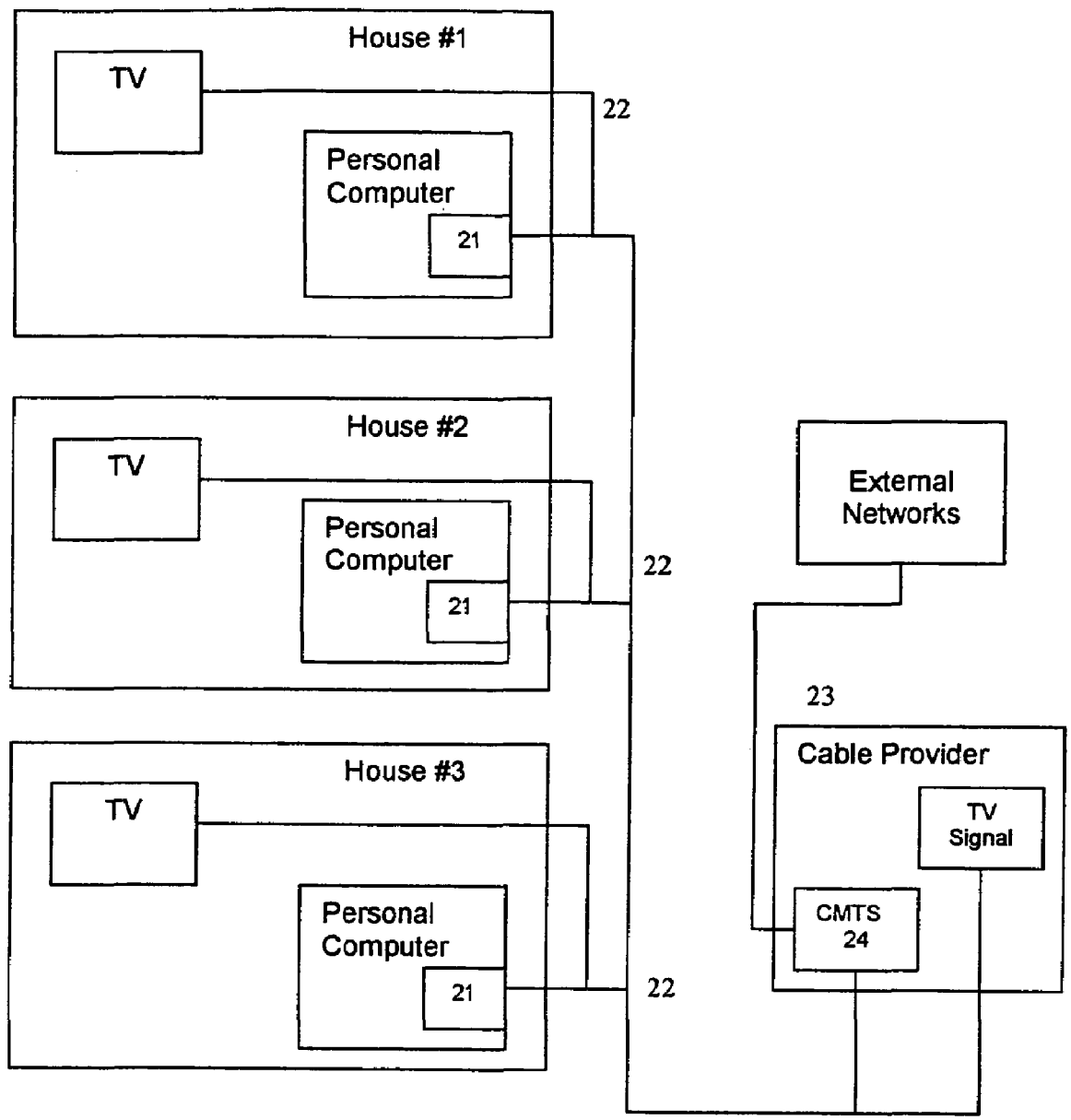
FIG. 1 illustrates a cable modem configuration of the present invention.

In a general cable modem-type configuration of the present invention, which is shown in FIG. 1, a CM 21 in a personal computer is connected to a coaxial cable 22 provided for cable television, wherein the coaxial cable 22 is generally routed to the cable provider's facilities 23. Within these facilities the coaxial cable 22 is connected to a cable modem termination system (CMTS) 24, which acts as a sort of hub for interconnecting a plurality of CMs 21 to each other-through a cable modem-type network, as well as interconnecting each of the CMs 21 on the network to the Internet through an interface.

Upon startup of an individual CM 21, for example, various parameters are initialized and/or ranged in. During this process, CM 21 communicates with the CMTS 24 through the coaxial link 22 to complete the initialization process, and therefore, CMTS 24 recognizes the presence of an active CM 21 on the network. Thereafter, CM 21 is capable of sending and receiving data throughout the cable network and external networks. However, all packets sent or received by the individual CMs 21 on the network are transmitted through the CMTS 24. Therefore, in view of the fact that a number of CMs 21 will often share the coaxial link 22 between the CMs 21 and the CMTS 24, each individual CM 21 requests access to use the coaxial link 22 from the CMTS 24 prior to transmitting a data frame to the CMTS 24 for distribution to another CM 21 or to an external network, such as the Internet. Alternatively, the CMs 21 simply monitor the coaxial link 22 for incoming data having a destination address appended thereto that indicates that the data is destined for the particular CM 21. If the data is destined for another CM 21, then the data is untouched by the non-destination CM 21.

In view of the configuration of the CM system of the present invention, and in particular, the vast functions undertaken by CMTS 24 in the CM system, it is apparent the functions of the CMTS 24 have a substantial effect upon the effectiveness of a CM-type system. Therefore, the present invention provides structure and configuration for a CMTS 24, wherein the CMTS 24 is configured to implement flow management and data classification while maintaining linespeed CM operations.

Figure 2:
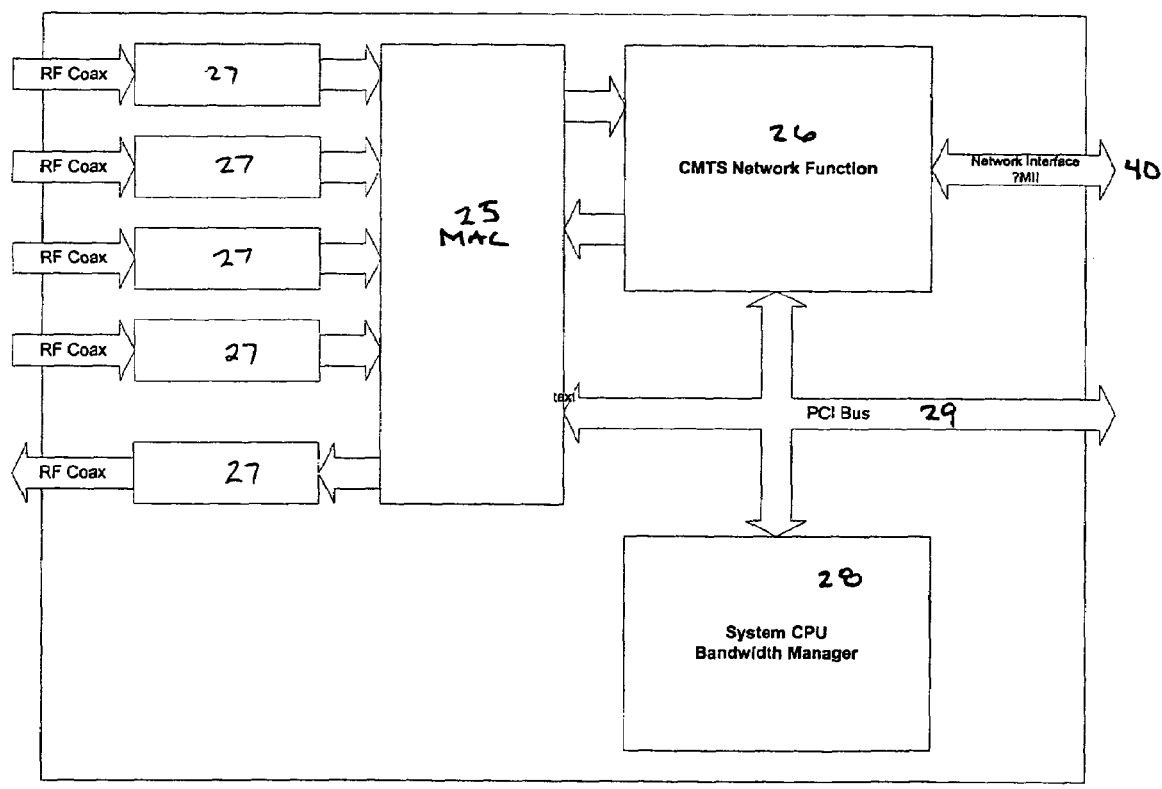
FIG. 2 illustrates an exemplary CMTS of the present invention.

A high-level block diagram of an exemplary CMTS 24 is shown in FIG. 2. The exemplary CMTS 24 includes a media access controller (MAC) 25, the CMTS network function module (CMTSNF) 26, a plurality of physical layer interfaces 27, and a central processing unit (CPU)/bandwidth manager 28. Generally speaking, CMTSNF 26 interfaces with MAC 25 to transmit information/packets between the two modules. CPU 28 is generally configured to manage bandwidth processing, and is in communication with both MAC 25 and CMTSNF 26 via PCI bus 29. MAC 25 interfaces with the plurality of upstream and downstream physical layer interfaces (PHYs) 27. CMTSNF interfaces to external networks through an external interface, such as an RMII interface, for example, which may be 100 BT or 1 Gigabit Ethernet.

With greater particularity, the physical layer interfaces 27 are divided into upstream PHY components and downstream PHY components, which collectively operate to interface with radio frequency (RF) circuitry. The upstream PHY components operate to receive data from other CMs 21 and the CMTS 24, and therefore, the upstream PHY components operate as demodulators. The downstream PHY components operate to transmit data from CM 21 to other CMs 21 on the cable network or CMTS 24, and therefore, since the signals on coaxial cable 22 are modulated signals, e.g. RF, the downstream PHYs operate as modulators. MAC 25 operates to prepare packets for transmission and reception to/from CMTS 24. This preparation process may include functions such as encryption, decryption, suppression, expansion, concatenation, fragmentation, multiplexing, and demultiplexing, among other operations. MAC 25 may also generate statistics about the upstream burst as well as support the PHY components in terms of system timing. CPU 28 operates to manage all system issues, and in particular, all I.E.E.E. data-over-cable service interface specifications (DOCSIS) system issues such as scheduling, provisioning, accounting, and configuring will be handled by CPU 28. However, it should be noted that CPU 28 is illustrated as an on-chip component in FIG. 2 for purposes of easy illustration only. The present invention includes placement of CPU 28 either on-chip, or alternatively, off chip, if the configuration dictates. CMTSNF 26 will interface through CMTS 24 to external networks, generally through a standard network technology like 100 BT or Gigabit Ethernet. CMTSNF 26 will receive incoming packets from MAC 25 and provide the DOCSIS upstream Quality of Service (QOS) functions. This includes features such as rate shaping, bandwidth limiting, and priority queuing, among other DOCSIS features. CMTSNF 26 will provide the same downstream QOS functions found in DOCSIS 1.1. Beyond the QOS functions, CMTSNF 26 will assist to bridge traffic onto the downstream channel. In particular, if a packet is destined for the downstream channel it will generally first be classified as specified by DOCSIS 1.1, which is an operation executed by CMTSNF 26. Aside from the classification and bridging functions, CMTSNF 26 will also provide some routing functions to route the PCI bus 29 to and from the Ethernet and Cable systems.

Therefore, through the structure and configuration of the CMTS 24 shown in FIG. 2, the CMTS 24, and more particularly, CMTSNF 26, provides a QOS function for both the upstream and downstream packet flow, a classification function for packet flow, and a bridging/routing function for packet flow. The exemplary configuration, however, has split the classification functions into two pieces. The first part of the packet classification scheme is accomplished in the bridging/routing functions, and the second part of the packet classification scheme will be accomplished in the front end of the downstream processing.

Turning to the QOS related functions, a description of the algorithms/methods used to implement the QOS, classification, and bridging/routing functions will first be presented. Addressing the QOS functions, it should first be noted that the QOS requirements of DOCSIS 1.1 will be provided for by CMTSNF 26. In order to implement the DOCSIS QOS scheme, the present invention utilizes a modified version of the known leaky-bucket algorithm. The leaky bucket algorithm, which will not be detailed in this application, is thoroughly detailed in the publication "A Scalable Architecture for Fair Leaky Bucket Shaping" written by Jennifer Rexford, Flavio Bonomi, Albert Greenberg, and Albert Wong, which is hereby incorporated by reference into this application. The modified version of the leaky bucket algorithm is what CMTSNF 26 uses to generate a near zero jitter solution in phone calls, for example, even if a scheduler schedules the phone call packets with jitter. However, before describing the modification to the leaky bucket algorithm of the present invention, a brief description of the basic algorithm will be given.

Figure 3:
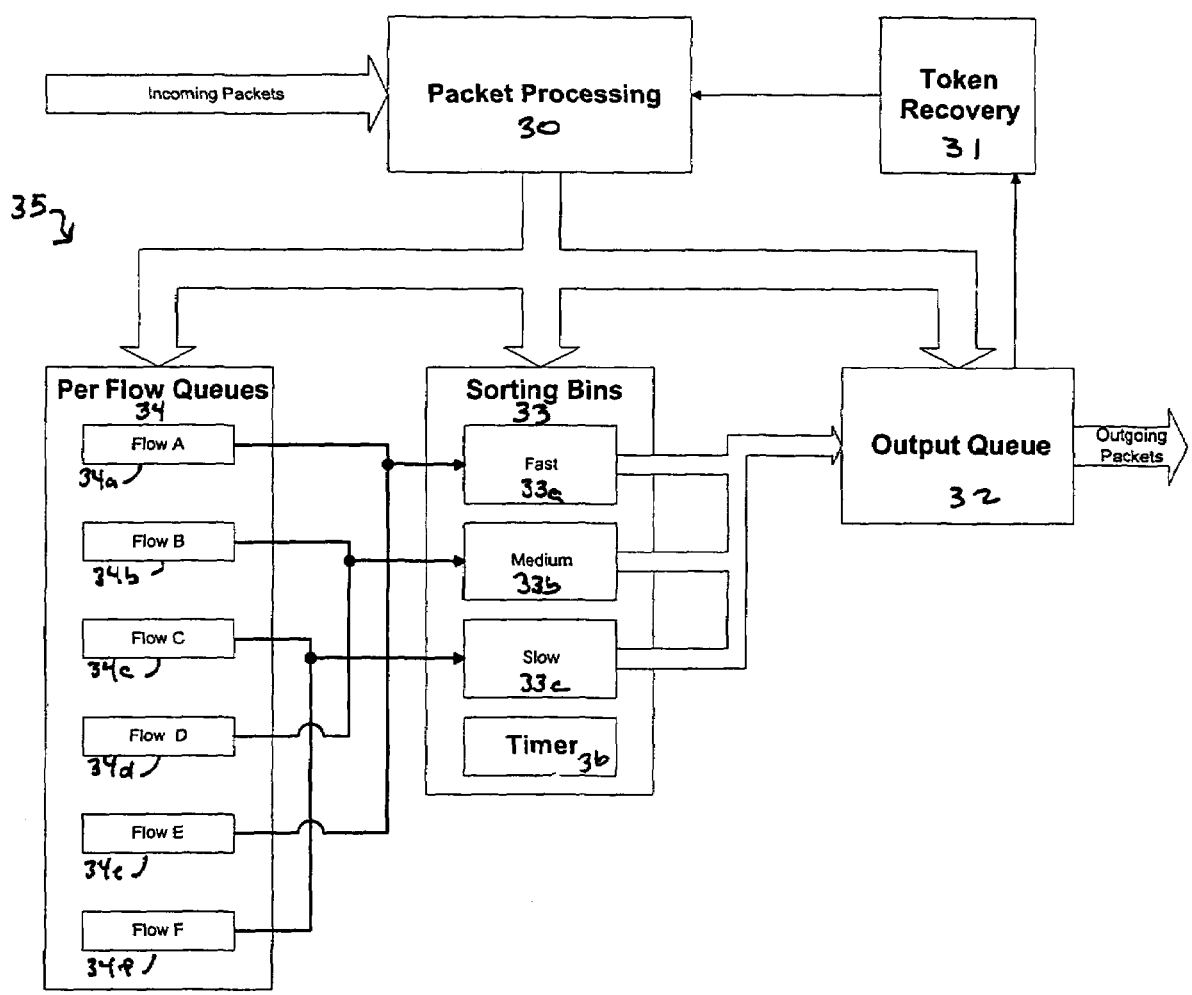
FIG. 3 illustrates an exemplary configuration of a scalable architecture for fair leaky bucket shaping of the present invention.

FIG. 3 illustrates an exemplary configuration of a scalable architecture for fair leaky bucket shaping (SAFLBS) 35. FIG. 3 shows five major blocks in the SAFLBS. The packet processing module 30 determines where to put an incoming packet. The Per Flow Queues (PFQs) 34 store packets per flow while they are waiting to be shipped out. PFQs 34 are generally the storage mechanism for the rate shaping. The bins (SBs) 33 are used to hold off a packet, before shipping it out. SBs 33 generally have different storage mechanisms for each class of flow. The Output Queue (OQ) 32 is the final storage location, although only for a short period of time, for a packet before it gets shipped out. The Token Recovery module (TRM) 31 is used to keep track of the state of each individual flow. The exemplary configuration shown in FIG. 3 illustrates 6 individual flows 34a, 34b, 34c, 34d, 34e, and 34f with 3 different types of rate shaping 33a, 33b, and 33c.

In operation, the initial state of SAFLBS 35 is that all queues 34 and bins 33 are empty. No packets are stored in this system at all. A packet (Packet #1) is received by the packet processing module 30, and the packet processing module 30 identifies the flow, which in DOCSIS is the service identification. The packet processing module 30 then determines if the flow (Flow A) is idle, or has a stored packet already. Being idle, as all flows and bins are empty, the packet processing module 30 determines if Packet #1 can be put directly in the output queue or if it must be shaped and put in a sorting bin 33. If the packet can be put in the output queue 32, it is put there and the flow then would be labeled not idle, which could be similar to taking a token in a token ring type network type configuration. The output queue would deliver the packet out of the output port of the system. The output queue would also return the token. However, since no other packets have arrived, the system returns to the state prior to packet #1's arrival.

Alternatively, if packet #1 needed to be shaped, then it would have been put into a sorting bin 33. Entry into a sorting bin 33 would put Flow A in ten-idle state and use a token. Each flow generally has it's own QOS parameters, which operate to specify both the throughput rate and the burstiness allowed for that particular flow. These parameters get mapped into a specific sorting bin 33. Each sorting bin 33 has a timeline of bins to take packets, which is used to properly delay the packets. Therefore, if packet #1 gets put in a delayed bin in the Fast SB 33a, then the SB then uses it's timer 36 to schedule the delivery time of each bin. Once the delivery time of the bin that packet #1 has arrived, SB 33a will move the packet into the Output Queue 32, which will deliver the packet out of the output port of the system. Output queue 32 will also return the token to the token recovery module 31. Since no other packets have arrived, the system returns to the state prior to packet #1's arrival.

Further still, if two packets arrive back to back, a different scenario occurs. Assume that packet #2 in Flow B 34b arrives. The packet processing module 30 determines that the packet must be put in SB Fast 33a. Packet #3 in Flow B 34b arrives. The packet processing module 30 determines that Flow B 34b is not idle. It then puts Packet #3 in the PFQ in the Flow B queue 34b. Timer 36 in SB 33 moves Packet #2 to OQ 32 upon expiration of the appropriate time. OQ 32 them ships the packet out and returns the token to token recovery module (TRM) 31. TRM then checks to see if there are any outstanding packets in Flow B 34b, and determines that packet #3 is outstanding. TRM 31 then re-posts Packet #3 to packet processing module 30 and sets Flow B 34b to an idle state. Packet #3 then continues through SAFLBS 35 as Packet #1 did in the previous example.

Figure 4:
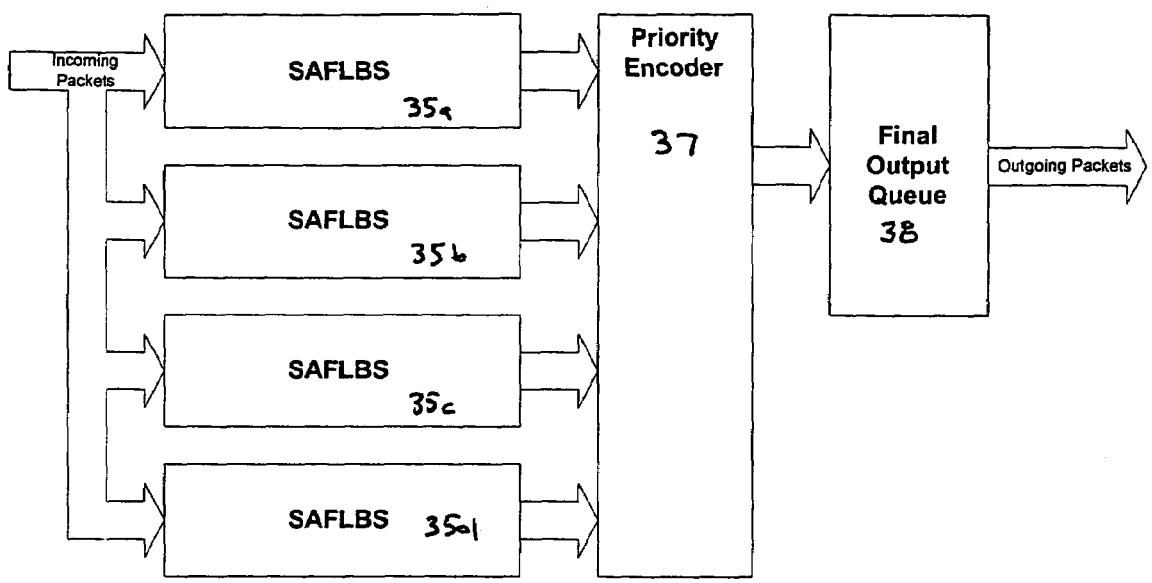
FIG. 4 illustrates an implementation of priorities into the CMTS of the present invention through multiple SAFLBSs.

The general configuration of SAFLBS 35 discussed above is able to handle many individual flows with many classes of flows, along with addressing latency, jitter, and throughput. However, the embodiment of SAFLBS 35 illustrated in FIG. 3 does not handle priorities, which are relevant to obtaining acceptable latency and jitter characteristics for voice and video applications. The embodiment of the present invention implements priorities into SAFLBS 35 through the configuration shown in FIG. 4, wherein an individual SAFLBS 35a, 35b, 35c, and 35d is provided for each priority, which in turn generates an QO 32 for each priority (not shown). A priority encoder 37 is connected to the output side of each OQ 32 within the individual SAFLBSs 35a, 35b, 35c, and 35d to move packets from each OQ 32 within the respective SAFLBS 35 to a final OQ 38. During this process, priority encoder 37 may modify and/or append a priority designation to the packet being transmitted from the individual output queues 32 to final output queue 38. The priority is modified and/or appended in accordance with a predetermined algorithm, which is generally determined by the user through a CPU. This configuration allows each SAFLBS 35 to operate undisturbed, while providing priority service for CMTS 24.

In addition to the ability to prioritize packets, CMTS 24, and in particular CMTSNF26, is configured to generate minimal latency with no jitter flow for prioritized applications/processes, such as VoIP type phone calls traveling through CMTS 24. The SAFLBS 35 approach shapes flows and includes mechanisms to reduce an additional jitter that may be caused by the configuration of SAFLBS 35. However, it may be preferred to have some limited, but additional latency with no jitter, which can be created through the implementation of a scheduled bin 39. Scheduled bin 39, which may physically located within SB 33 in FIG. 3, may have a fixed number of slots available to take a set of fixed size packets. Scheduled bin 39 would, therefore, receive the first packet of a phone call traveling through CMTS 24. Scheduled bin 39 then operates to find the nearest open SB 33, and the telephone packet will get placed in the located bin. Thereafter, for the rest of the particular phone call session, every phone call related packet for the session will get put in this particular bin, regardless of the arrival time of the packet, which may require CPU/bandwidth manager 28 to delay the first packet to the end of its jitter range for optimal operation.

Figure 5:
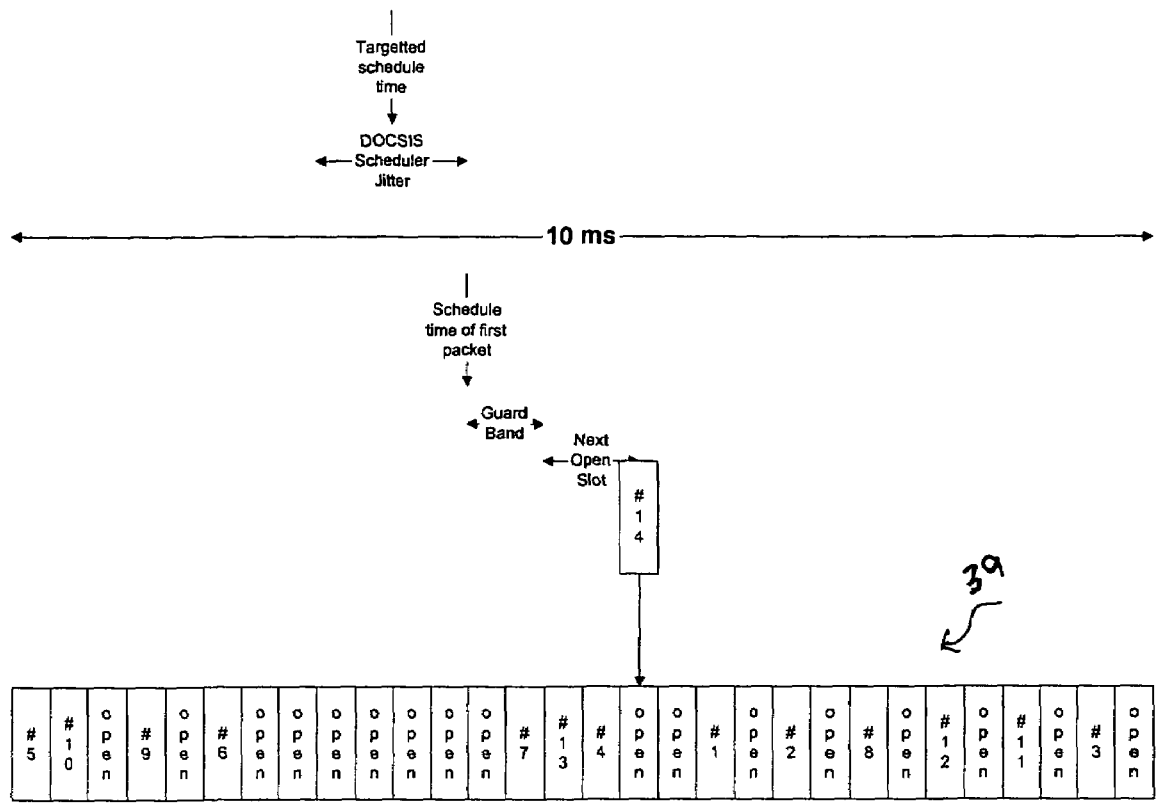
FIG. 5 illustrates an exemplary configuration of a scheduling bin of the present invention with a timescale overlay.

FIG. 5 illustrates an exemplary scheduled bin 39 with a timescale overlay, wherein a 10 ms sampling of the phone call is assumed for illustrative purposes. Within the 10 ms window, the DOCSIS scheduler will decide where this phone call will occur. The DOCSIS scheduler has a jitter window wherein it may schedule the slot for CM 21 to send the phone packet. To use this feature, the DOCSIS scheduler must grant the initial packet of the phone call at the tail end of the jitter window, and generally must assign the upstream QOS parameters to the SID of this phone call into the map of scheduled bin 39. Scheduled bin 39 will then receive the first packet and jump some safe, but short amount in the future of the scheduled bin and search for the next open slot. The jump in time is to assure that this packet will go out before the next packet for this particular phone call arrives. Once scheduled bin 39 finds the next open slot, then schedule bin 39 will remember the slot number for this SID. From then on all packets received on this SID will be put in this same slot, which operates to generate a near zero jitter condition. However, if a Voice-over-Internet-Protocol (VoIP) user does not prefer this feature, then the DOCSIS scheduler can send upstream QOS parameters routing phone packets to another sorting bin, thus avoiding the jitter function of CMTS 24.

This QOS solution can be applied to both upstream and downstream packet flows of CMTSNF 26. Although scheduled bin 39 has been described with respect to an upstream configuration, a downstream solution using a similar configuration is contemplated within the scope of the present invention. However, when implementing the QOS solution of the present invention in the downstream packet flow, it should be noted that the flow of data from the network side of CMTS 24 is generally not controlled by CMTS 24, whereas the flow of data from the coaxial cable 22 is dictated by CMTS 24 in the upstream. Therefore, generally speaking, as long as the jitter of the phone packets is bounded within a range of less than approximately 10 ms, scheduled bin 39 could be applied to the downstream configuration of the present invention.

In addition to the QOS solutions presented above, the network functions module 26 of the present invention also provides bridging, routing and classifying functions for CMTS 24. CMTSNF 26 is configured to bridge traffic to the downstream data flow of CMTS 24, while also operating to route traffic from the PCI port 40 to both the downstream and the network port. CMTSNF 26 is further configured to route upstream packet flows and network traffic to PCI port 40, and therefore, CMTSNF 26 may also be described as a simultaneous downstream and PCI bridge. CMTSNF 26 is configured to learn the MAC-Ethernet-addresses of all the end points of all of CMs 21 on the cable modem network. Likewise, CMTSNF 26 learns all of the endpoints on the PCI bus MAC addresses. If an upstream packet matches any of these addresses, then the bridge knows where to route the packet. If an upstream packet misses these learned addresses, then the packet generally gets routed out the network port for distribution to addresses not on the local CM network. Generally, all inbound packets received from the PCI bus 40 will be treated the same way, with the possible exception of PCI packets that hit PCI addresses, wherein CMTSNF 26 may be programmed to resend these packets on the PCI bus 40, or take alternative action. However, in normal operation, all network packets will generally correspond to either a PCI address or a downstream MAC address, and will therefore be forwarded accordingly. These functions are accomplished through the use of a content addressable memory (CAM) 41, as is known in the art.

Figure 6:
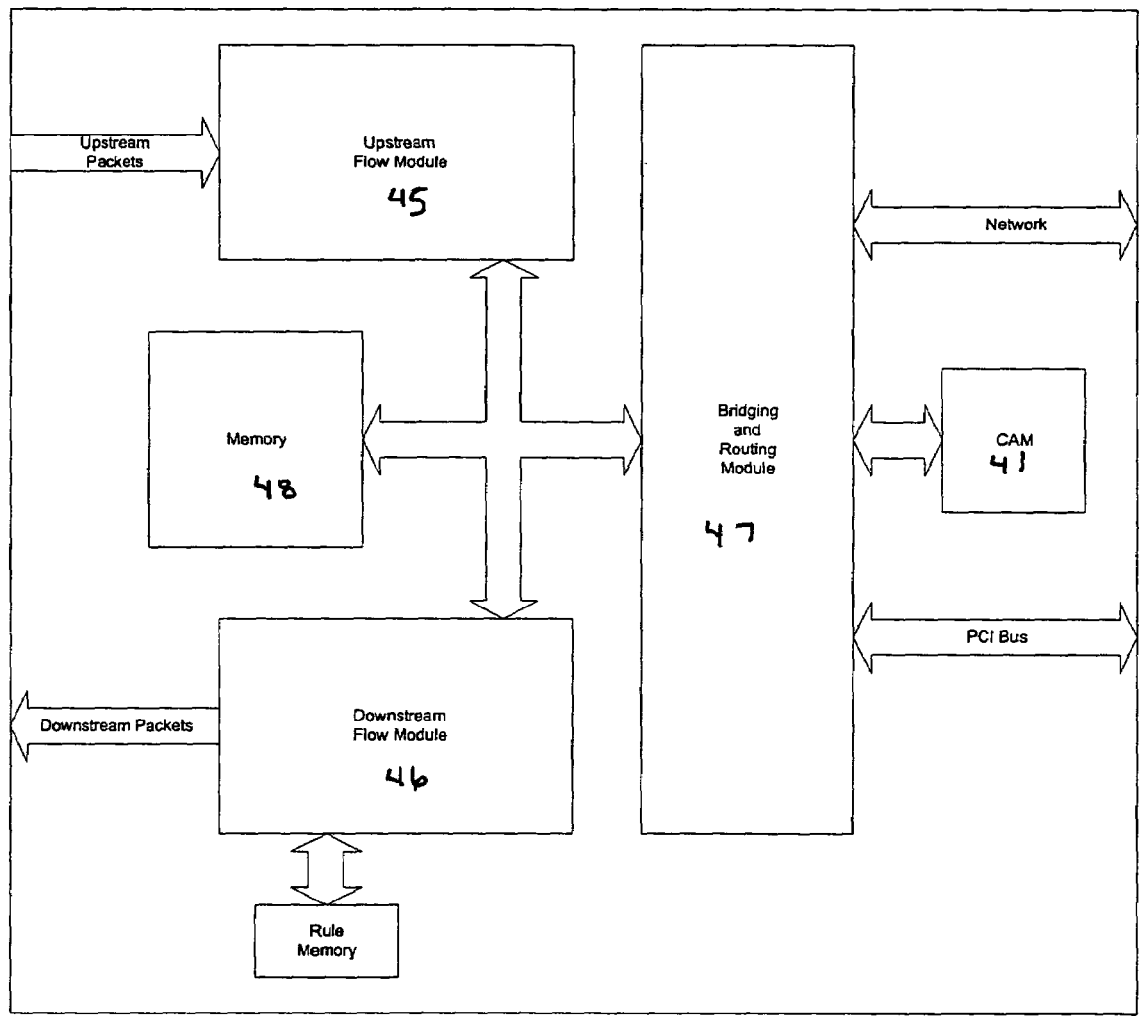
FIG. 6 illustrates an exemplary architecture of the cable modem termination system of the present invention.

CMTSNF 26 is configured to provide a solution to cover the DOCSIS 1.1 classification features. However, providing this solution is complicated by the fact that the DOCSIS 1.1 specification specifies a solution space that in nearly endless, as over $2^{40}$ possible sets of classifications are specified. Therefore, in order to address the vast range of DOCSIS classifications without requiring a mechanism capable of processing $2^{40}$ rules at linespeed, the present invention employs a split approach to the classification scheme. More particularly, a classification scheme for the DOCSIS CMTS 24 of the present invention dictates that packets are to be bridged to the downstream and mapped an service flow identification (SFID). From there, the SFID can be used to determine downstream QOS parameters and Payload Header Suppression (PHS) rules. However, the SFID is generally a 32-bit field, and therefore, there could be numerous SFIDs per CM 21. Building a CAM 41, as shown in FIG. 6 that could hold all the possible SFID, PHS matches, and rules is generally prohibitive due to the required resources. However, the present invention addresses this situation by splitting the functions of CAM 41. More particularly, CAM 41 is used to determine which CM 21 the packet is destined for from a cable modem ID, and then the search for SFIDs, and PHS rules can be limited through a CM 21 search. CAM 41 is already configured to do the bridging for the downstream, and therefore, in order to add this additional feature, the CMTS 24 system software should provide an upstream SID to a Cable Modem Identifier (CMID) table to the learning function of the bridge. This allows CAM 41 to hold a CMID instead of a simple hit or miss bit, and therefore, the CMID can be used to offset into a large rule table. By using the CMID, the rules applicable to that single modem would be the only rules searched.

However, narrowing the rules search to only rules for a given CM 21 has not completely solved the problem, as the classification for packets destined to a specific CM 21 is still unresolved. Again, considering the potential vastness of a classification solution under DOCSIS, a compromise solution is presented by the present invention. In particular, instead of attempting to cover the entire solution space per modem, a fixed amount of memory space may be allocated to each modem for all of it's rules. This fixed amount of space may be, for example, 1 K bytes, which may be formatted in several ways. An exemplary solution is to use the following format. The first 8 bytes represent the mask for the classifier. For each bit set in the mask, a byte will follow the 8-byte mask field. If all 64 bits of mask are set, then 58 bytes of data will follow the 8 mask bytes (The 6 byte destination address is generally no longer needed, and therefore not stored). Following the mask data will be a 4 byte SFID, a 2 byte PHS index, and a 2 byte QOS field. This exemplary format would create a maximum rule length of 74 bytes, which allows for 13 maximum length rules. Although it is unlikely that every rule will be of maximum length, if a mask held 30 bytes in it, then it would be considered a long rule. Given that an average rule may be 32 bytes, then 32 rules per CM 21 could be contained in 1 K bytes. The size of 1 K byte was chosen in the example, as 1 K byte can be read out of a 32 bit wide SDRAM in a burst in less than the time it would take a 64 byte Ethernet packet to arrive on a 100 Mbs Ethernet link. As a further example, 1 K bytes would also allow 2048 modems worth of rules to be stored in 2 Mbytes. Considering each of these parameters, the total size of the memory and the time necessary to get the rules out of the memory are both achievable with a dedicated SDRAM memory port.

With the general operational characteristics described, the specific architecture of an exemplary CMTSNF 26 is shown in FIG. 6. The architecture of CMTSNF 26 is segmented into 3 major submodules: upstream flow module (UFM) 45, bridging and routing module (BRM) 47, and the downstream flow module (DFM) 46. Generally speaking, the QOS solutions will be contained in the UFM 45 and DFM 46, while the bridging and routing solutions will be contained in BRM 47. The Classification solution has been split between BRM 47 (the CAM 41 part of the classification solution) and the DFM 46 (the rule search part of the classification solution). All three modules connect to a memory module 48.

Figure 7:
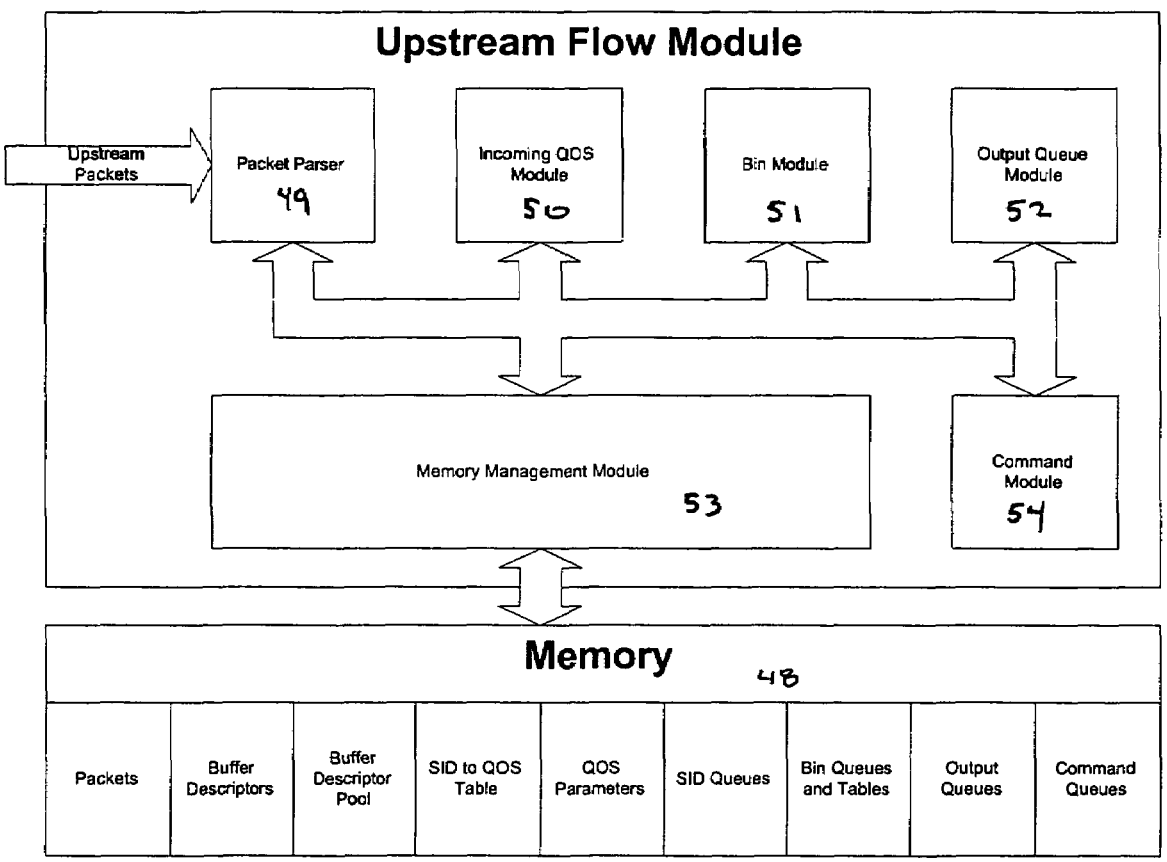
FIG. 7 illustrates an exemplary configuration of an upstream flow module of the present invention.
Figure 8:
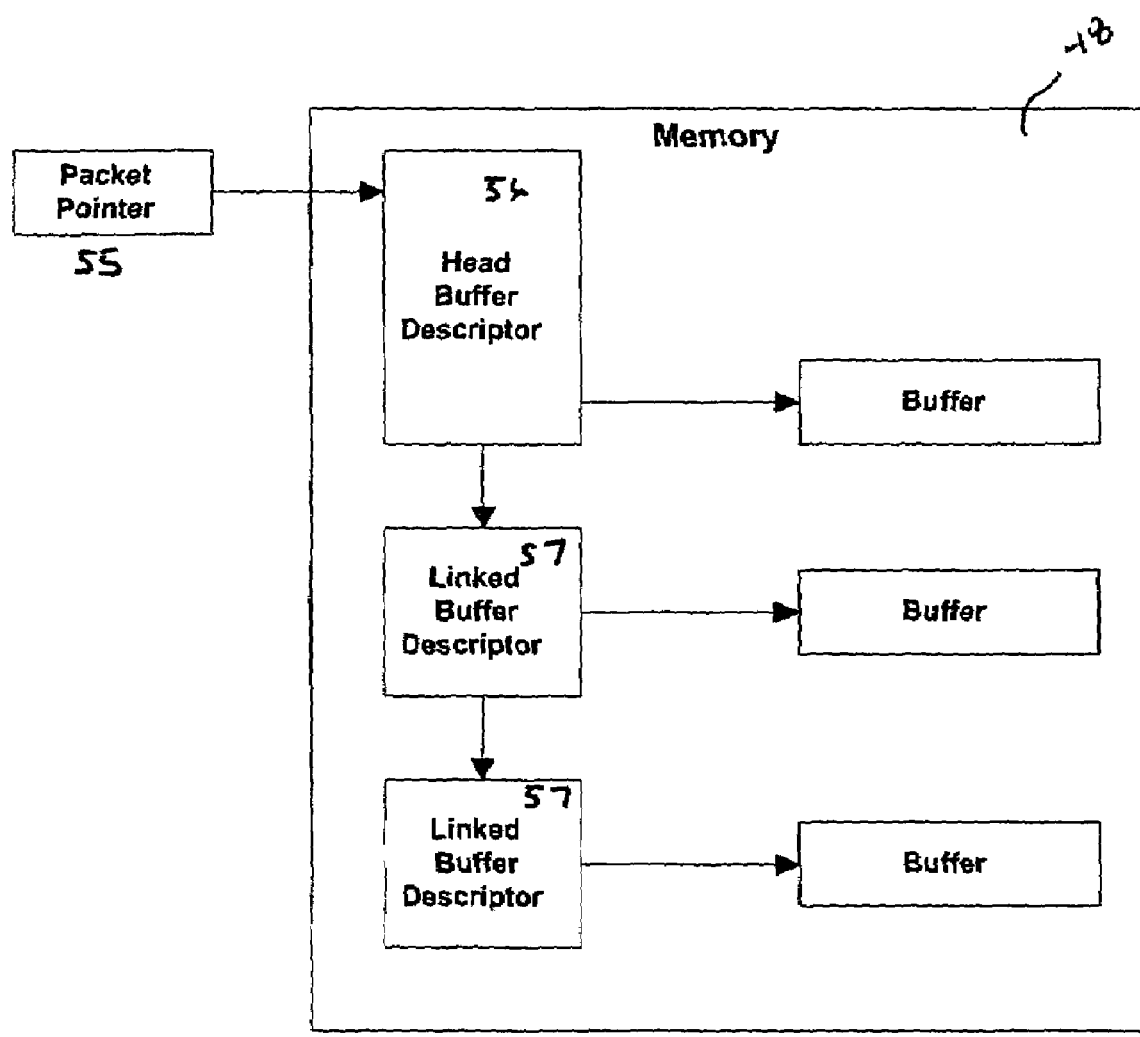
FIG. 8 illustrates an exemplary diagram of the memory architecture of the present invention.

UFM 45, as noted above, provides the QOS for upstream packet flows. An exemplary configuration of UFM 45 is shown in FIG. 7. UFM 45 generally operates to receive packets from the MAC 25. These packets will generally either be encapsulated packets with additional information or normal packets with a few special control packets. In either case a packet parser module PPM 49 receives packets and puts them in memory 48. PPM 49 signals an incoming QOS module (IQM) 50 that a packet has arrived. IQM 50 performs the packet processing and token recovery functions described in the SAFLBS solution above. IQM 50 may be configured to signal either the bin module 51 or the output queue module (OQM) 52 about an arriving packet. Bin module 51 performs the sorting bin 33 and scheduled bin 39 functions described in the SAFLBS solution above. The timer in bin module 51 may then signal the OQM 52 about the arriving packet. The OQM 52 performs the output queue 32 functions as well as the priority encode function described in the SAFLBS solution above. When a packet exits OQM 52, OQM 52 may then signal both the IQM 50 to return the token, and signal the bridge and routing subsystem to prepare it for the outgoing packet. The memory management module (MMM) 53 and the command module (CMD) 54 are used to manage buffers, buffer descriptors, tables and any other constructs used by the other modules, which are generally shown in FIG. 7. The memory system will implement a buffer descriptor system. Buffers are created with descriptors pointing to buffers with packet pointers pointing to buffer descriptors. This system will be used to minimize the memory accesses. Neither a buffer or buffer descriptor will get passed around, however, the pointers to the buffer and/or buffer descriptors may be passed around. Packet pointers represent packets, and a packer pointer will point to a buffer descriptor. This buffer descriptor may link to other buffer descriptors, and the set of buffer descriptors will generally contain all the buffers and header information for a single packet. This allows the buffer sizes and buffer descriptors to get tuned for the implementation of the architecture of the present invention, while the architecture processes packets and not pieces of packets. Therefore, UFM 42 expects complete packets, as it does not have the ability to defragment or deconcatenate packets. This allows the architecture of the UFM 42 to pass packet pointers from module to module instead of large buffer descriptors or even larger packets. The memory system will define a unified head buffer descriptor for all packets. This will allow any module to take a packet pointer and index into the head buffer descriptor to retrieve the information it needs, without reading the buffer descriptor to determine where the fields reside in the buffer descriptor. All other buffer descriptors required for holding the packets will be a smaller linked buffer descriptor. FIG. 8 shows a more detailed diagram of the memory system architecture. The diagram shows a single packet pointer 55 pointing to a head buffer descriptor 55. The head buffer descriptor 55 of the present exemplary configuration requires three buffers to contain the packet, and therefore, has 2 more linked buffer descriptors 57. The buffers do not have to be contiguous in memory, and in the present exemplary illustration, the packet pointer is not shown in the memory, as it may or it may not be in memory, according to the preferred implementation. The queues for the modules in the CMTSNF 26 may be in memory or held in internal FIFO's.

Returning to the modules shown in FIG. 7, packet parser 49 will receive a packet and parse the packet to extract any control information. It will get a buffer descriptor (BD) from the pool of BD's configured in the memory system. The packet will be stored in memory as pointed to by the BD. The SID extracted out of the control information will be placed in the BD. The type field of the BD will be changed to UFIQ as opposed to unused. The packet pointer 55 pointing to the BD will be put on the UF IQM 50 queue (UFIQ). As more information is needed to be extracted from control information, the packet parser will insert that information-into the head-BD.

IQM 50 gets invoked when there is something on the UFIQ or if a token has been returned. IQM 50 will retrieve the packet pointer from the queue, and it will get the SID out of the BD and use the SID to get the QOS parameters for this flow. Table 1 lists these parameters.

TABLE 1

| Mnemonic | Definition |
| --- | --- |
| SIDQF | Front of SID Q |
| SIDQL | Last of SID Q |
| SB | Sorting Bin Pointer |
| OQ | Output Queue Pointer |
| C | Conformance Time |
| X | Current Time |
| PHY | SAFLBS parameter |
| RO | SAFLBS parameter |
| B | SAFLBS parameter |
| G | SAFLBS parameter |
| TYPE | Scheduled or sorting |
| ST | State - Idle/Initial, or Active |
| SS | Scheduled Slot number |

Using these parameters, the packet is labeled sorting bin or scheduled bin. If this is a sorting bin packet, then the state of this bin must be read from a bin table. If the state is not idle (Active), then the packet pointer is put on the SID queue corresponding to this SID. If the state is idle, then conformance time is computed. If the conformance time allows the packet to be placed in the output queue, IQM 50 uses the pointer found in the QOS parameters to place the packet pointer 55 on the appropriate output queue 32. If the conformance time does not allow direct output, then the IQM 50 will place the packet pointer 55 in the appropriate bin of the sorting bin 33. In either case, a new conformance time is calculated and the state of the SID is set to not idle (Active).

IQM 50 may have had to place packet pointer 55 into a scheduled bin 39 as opposed to a sorting bin 33. If the packet is destined to a scheduled bin 39, then IQM 50 checks the scheduled state in the QOS parameters. If the state is in the initial state, then the packet is assigned the next available slot after the guard slots. The slot number is recorded in the QOS parameters. The scheduled state is then labeled active. Now that the scheduled state is active all-future packets for-this connection will read the slot number to be placed into. IQM 50 will also be invoked when a token is returned. This operates the same as when an incoming packet arrives, except instead of using an incoming packet, IQM 50 checks to see if the SID that returned the token has a packet stored in it, wherein that packet is SID Q. If the packet has been stored, then the packet pointer 55 is moved to the appropriate queue and the state is left Active. If no packets are stored, then the state changed to idle or initial.

Figure 9:
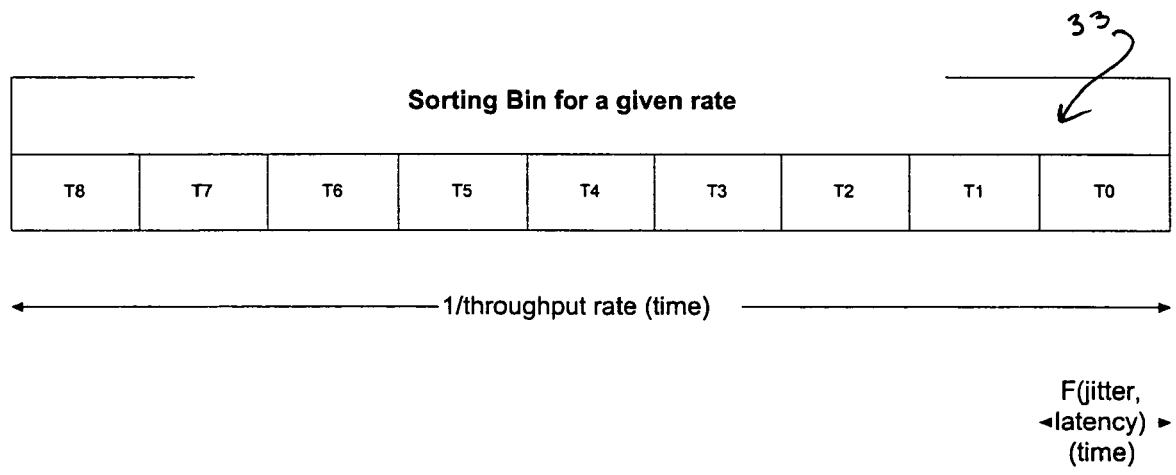
FIG. 9 illustrates an exemplary sorting bin of the present invention.

Bin module 51 holds the sorting bins 33 and scheduled bins 39. These types of bins are generally configured to solve shaping problems. The sorting bins 33 shape traffic and the scheduled bins 39 schedule it. Sorting bins 33 are configured to properly delay incoming traffic to meet some specified throughput rate, latency characteristics, and jitter. FIG. 9 illustrates an exemplary sorting bin 33. The exemplary sorting bin 33 has a width that is the inverse of the throughput rate. This operates to guarantee that an incoming packet has a location in an idle stream. The sorting bin 33 is subdivided into mini-bins, which are primarily used to deal with latency and jitter, and generally have only a minimal depth. However, multiple packets may be placed into the same mini-bin. In previous discussion, an incoming packet was placed into the sorting bin, which is not synonymous with placing it into a queue. Although queues may be used, queues may be inefficient for some embodiments of the present. Alternatively, it may be best to have each mini-bin use a link of packet pointers. This allows the bin table to point to the heads of the mini-bins. Table 2 illustrates an example of the contents held in a bin table.

TABLE 2

| Mnemonic | Definition |
| --- | --- |
| SBID | Sorting bin ID |
| NMB | # of mini-bins |
| MB1H | Mini-bin #1 header |
| MB1T | Mini-bin #1 tail |
| SBT | Sorting bin timer threshold |

Sorting bins 33 all have timer thresholds to know when to empty the most recently used mini-bin. When this latest mini-bin get moved to output queue 32, it must become the newest mini-bin. A latest mini-bin pointer traveling across the mini-bins may be employed to implement this feature. An ordered linked list of thresholds allows a comparator to check only one threshold. If the threshold has occurred, then the threshold for the matched sorting bin could be added to the current time and placed back into the linked list. Once a mini-bin has expired, they sorting bin moves the packet pointers from the mini-bin linked list to output queue 32

Returning to the description of scheduled bin 39, an example of the operation of scheduled bin 39 for VoIP applications, such as G.729 phone calls will be presented. Assuming that the maximum output rate of the sum of 10 millisecond sampled G.729 phone calls will never exceed 100 mbs, no more than 1839[100,000,000/(100*68*8)=1839] G.729 different phone calls could be supported. The scheduled bin in this embodiment, therefore, would never need more than 2048 mini-bins. This particular exemplary configuration is a likely candidate for implementation on-chip, instead of using external RAM, simply as a result of the small size. Since G.711 packets are generally 138 bytes they may be able to share the same scheduled bin and use two mini-bins at a time.

Output queue 32 is generally composed of all the flow output queues, a priority encoder 37, and a final output queue 38. The output queue module 38 is configured to find the individual output queue 32 with the highest priority and move a packet pointer from that queue to the final output queue 38. Then it would continually research for the highest priority queue with a packet and move a single packet pointer. The final output queue 38 would move its packet pointer to the BRM 44. The moving of the packet pointers again assumes a unified memory used by both the UFM 42 and BRM 44.

The intent of CMD 54 is to give CMTS 24 system controller assistance in setting up buffers and BDs. Any table that needs information from the CMTS system controller would get sent to the CMD 54 and CMD 54 would then get the information into the table. For the upstream flow sub system, CMD 54 will assist the memory system with the creation of the BD used by CMTSNF 26 and the PCI module 29. The SID to QOS table and the bin module 51 tables would be set up by CMD 54. The delivery of the queue pointers would come through CMD 54. Any special information parsed by PPM 49 destined for CMTS 24 would also be handled by the CMD 54.

Figure 10:
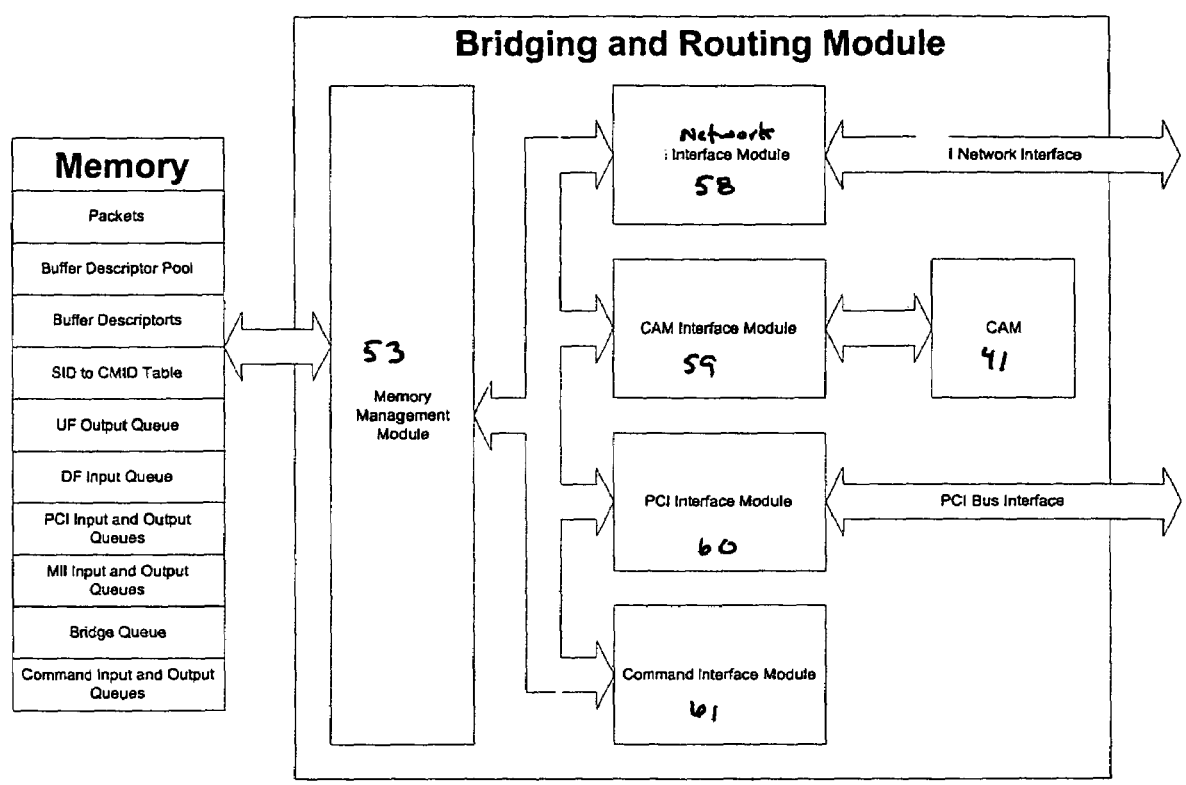
FIG. 10 illustrates the bridging and routing module of the present invention.

BRM 44 performs the bridging of packets to the downstream and the routing of packets to and from PCI bus 29. FIG. 10 illustrates an exemplary configuration of BRM 44. BRM 44 interfaces to the network port, which may be 100 BT or 1 Gb Ethernet, or other common network connection. BRM 44 also interfaces the PCI bus, as well as UFM 42 and DFM 46 via the memory system. Other than these interfaces, the BRM 44 houses CAM 41 to do the address lookups for CMTS 24.

The network interface module (NIM) 58 is configured to receive a packet for an industry standard network. NIM 58 may parse the packet to extract the source and destination address for a buffer descriptor. NIM 58 will obtain a BD from the pool of BD's configured in the memory system, as shown in FIG. 10. The packet will be stored in memory as pointed to by the BD. The SID extracted out of the control information will be placed in the BD. The type field of the BD will be changed to NIQ as opposed to unused. The packet pointer pointing to the BD will be put on the Network Input queue (NIQ). NIM 58 is also configured to send packets out on the network port. NIM 58 is configured to take the packet pointer out of the Network Output queue, retrieve the BDs for the packet, and spool the packet out. Once the packet has been shipped out, NIM 58 is configured to return the BDs to the buffer pool.

The PCI interface module 60 will receive a packet for an industry standard PCI bus. PCI interface module 60 is also configured to parse the packet to extract the source and destination address for the buffer descriptor. PCI interface module 60 will get a buffer descriptor (BD) from the pool of BD's configured in the memory system. The packet will be stored in memory as pointed to by the BD. The SID extracted out of the control information will be placed in the BD. The type field of the BD will be changed to PCIQ as opposed to unused. The packet pointer pointing to the BD will be put on the PCI Input queue (PCIQ). The PCI module will also send packets out on the PCI bus. The PCI module will take the packet pointer out of the PCI Output Queue (PCIOQ). It will retrieve the BDs for the packet and spool the packet out. Once the packet has been shipped out, the PCI module will return the BDs to the buffer pool.

The CAM interface module 59 is only module in the BRM 44 that does something other than transport the packets. CAM interface module 59 must either have an arbiter to determine which of the three sources of packets (Upstream Flow Output queue, Network Module Input queue, or the PCI Input queue) to get a packet from or an arbiter will have previously moved the packets from the sources into a single bridge queue. In either case, a packet pointer is given to CAM interface module 59. The type of the packet is also extracted from the BD. If the type of packet is an UFIQ or PCIIQ, then the then the CAM interface module 59 may have to learn a new entry. The source Ethernet address is retrieved, and the source address is searched for in the CAM 41. The format of the CAM 41 is shown in Table 1.

TABLE 1

| Ethernet Address | Routing information | Cable Modem Identifier (CMID) |
| --- | --- | --- |
| 6 bytes | 2 bits<br>00 - miss<br>01 - Downstream hit<br>10 - PCI hit<br>11 - Reserved | 14 bits |

If the source address already resides in CAM 41, then the destination address is used. If the source address in not in CAM 41, and if the packet is of type UFIQ, the SID of the packet is used to lookup in the SID to CMID table to find the CMID. If the SID is not found in that table then the packet will get moved to an exception queue and this exception will be reported to the CMTS system controller. If the SID is found in the SID to CMID table, then the source address, CMID, and routing bits (set to downstream) are stored in CAM 41. If the source address is not found and the type of packet is PCIQ, then the source address, routing bits (set to PCI), and any CMID are stored in CAM 41.

With regard to the destination address, regardless of the input source the destination address is searched in CAM 41, which is the bridging and routing function. If the destination address is not found in CAM 41, then if the packet is not of type NIQ, then it is directed to the network output queue. If this "missed" packet was of type NIQ, then the packet gets discarded. The BDs for the packet are returned to the pool. If the packet hits an entry in CAM 41, the routing bits direct which queue to direct the packet pointer. If the routing information equates to a PCI hit, then the packet pointer get directed to the PCI output queue. If the routing information equates to a downstream hit, then the packet pointer gets directed to the rule queue (RQ). The CMID will also get inserted into the head BD for this packet.

The intent of the command interface module 61 is to give the CMTS system controller assistance in setting up buffers and BDs. Any table that needs information from the CMTS system controller would get set to the command interface module 61 and the command interface module 61 would then get the information into the table. For the BRM sub system, the command interface module would assist the memory system with the creation of the BD used by NIM 58 and the PCI interface module 60. The SID to CMID table would be managed by the command interface module 61. The command interface module 61 would also have to resolve the Exception Queue with the CMTS systems controller. If the exception packets are held until command interface module 61 can get the needed entry into the SID to CMID table, then exceptions could be handled entirely by the command interface module 61.

Figure 11:
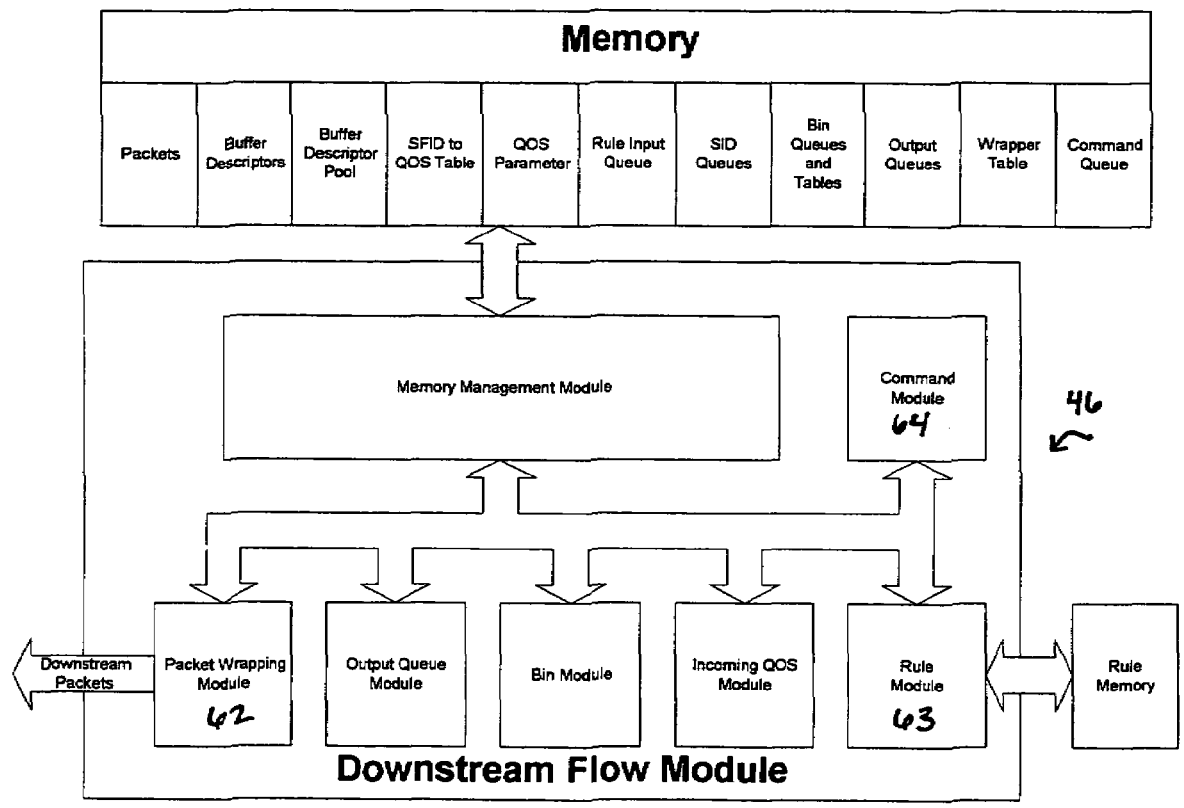
FIG. 11 illustrates an exemplary configuration of the downstream flow module of the present invention.

A detailed illustration of DFM is shown in FIG. 11, which is similar to the UFM 42 discussed previously. SAFLBS 35 is implemented in DFM 43 as well as the UFM 42. In view of the previous recitation of UFM 42, which is similar to DFM 43, only the differences between DFM 43 and UFM 42 will be discussed with respect to DFM 43. The major difference is that DFM 43 has a rule module 63. Another difference is instead of parsing incoming packets, the DFM 43 will wrap outgoing packets. The rule module 63 performs the rule search of the packet classification described above. The rule module 63 will receive a packet pointer, retrieve the CMID of the packet from the head BD, and will use this CMID to generate a pointer to the rules for this CMID. The rules may be contained in a fixed amount of memory, which for example is 1 K bytes in the present exemplary embodiment. The rules will be burst read into the CMTSNF 26. The rules will be parsed and compared for a match, and the highest priority match will be saved. The SFID and the Payload Header Suppression Index will be extracted from the rule match and inserted into the head BD. The packet pointer will be given to the downstream input queue.

The packet wrapping module 62 will either wrap control information around the outgoing packets, or send separate control packets with the needed information. The SFID and PHS index will be sent down to MAC 25. The SFID may get replaced with downstream queue information.

Additionally, although the present invention has been described based upon the above noted embodiments, it would be apparent to those of skilled in the art that certain modifications, variations, and/or alternative constructions or configurations would be available, while remaining within the spirit and scope of the present invention. Therefore, in order to determine the metes and bounds of the present invention, reference should be made to the appended claims.

The invention claimed is:

1. A cable modem termination system, said system comprising:
   a media access controller;
   at least one physical layer transceiver in connection with said media access controller for receiving and transmitting data;
   a CPU interface configured to communicate with a CPU; and
   a network functions module in communication with said media access controller and said CPU interface, wherein the network functions module comprising an upstream flow module for providing quality of service for upstream packet flows, a bridging and routing module for performing bridging of packets to a downstream flow module and for routing the packets to and from a bus and the downstream flow module for providing quality of service for incoming packet flows and for wrapping outgoing packets, the downstream flow module comprising a rule module,
   wherein said network functions module is configured to conduct flow management and classification functions upon packets traveling through said media access controller and wherein the downstream flow module determines whether or not to wrap outgoing packets with control information.

2. A system as recited in claim 1, wherein said network functions module is further configured to conduct at least one of traffic policing, rate shaping, and scheduling.

3. A system as recited in claim 1, wherein said network functions module is further configured to both classify the packets traveling through said media access controller as well as conduct traffic policing and rate shaping upon the packets traveling through the media access controller.

4. A system as recited in claim 1, wherein said network functions module is further configured to conduct quality of service functions.

5. A system as recited in claim 4, wherein said network functions module is further configured to conduct quality of service functions compatible with predetermined specifications.

6. A system as recited in claim 5, wherein said predetermined specifications further comprise DOCSIS specifications.

7. A system as recited in claim 1, wherein said network functions module further comprises:
   the upstream flow module in connection with said bridging and routing module;
   the downstream flow module in connection with said bridging and routing module;
   a memory in communication with said upstream flow module, said down stream flow module, and said bridging and routing module; and
   a content addressable memory module in communication with said bridging and routing module.

8. A system as recited in claim 7, wherein said network functions module further comprises:
   at least one PCI bus interconnecting said bridging and routing module to other modules;
   at least one network interface for communicating with external networks;

at least one link in communication with at least one of said upstream flow module and said down stream flow module for transmitting and receiving packets from other systems.

9. A system as recited in claim 7, wherein said upstream flow module further comprises:
a memory management module;
an incoming quality of service module in communication with the memory management module; and
a bin module in communication with the memory management module, wherein the incoming quality of service module and the bin module are configured to cooperatively implement a modified scalable leaky bucket algorithm to support a quality of service function.

10. A system as recited in claim 9, wherein said upstream flow module further comprises:
a packet parser module in communication with said memory management module;
a command module; and
an output queue module in communication with said command module and said memory management module.

11. A system as recited in claim 7, wherein said bridging and routing module is configured to determine a cable modem identification and store said cable modem identification in said content addressable memory module.

12. A system as recited in claim 11, wherein said bridging and routing module further comprises:
a bridging memory management module;
a network interface module in communication with a network interface and the bridging memory management module;
a content addressable memory interface module in communication with said content addressable memory, said bridging memory management module, and said network interface module;
a PCI interface module in communication with a PCI bus interface, said content addressable memory, said bridging memory management module, and said network interface module; and
a command interface module in communication with said PCI interface module, content addressable memory interface, said bridging memory management module, and said network interface module.

13. A system as recited in claim 12, wherein said bridging memory management module and said content addressable memory module are configured to cooperatively operate to reduce a number of DOCSIS rules to be searched through determining a cable modem identification.

14. A system as recited in claim 7, wherein said upstream flow module further comprises:
at least one scalable fair leaky bucket architecture for shaping packets;
a priority encoder in communication with each of the at least one scalable fair leaky bucket architectures for prioritizing packets; and
a final output queue in communication with said priority encoder for transmitting prioritized packets.

15. A system as recited in claim 14, wherein each of said at least one scalable fair leaky bucket architecture further comprises:
a packet processing module for receiving and managing packet flow;
at least one per flow queue in communication with the packet processing module;
at least one sorting bin in communication with said packet processing module and said at least one per flow queue; and
an output queue in communication with said packet processing module.

16. A system as recited in claim 7, wherein said downstream flow module further comprises:
a memory management module;
a command module in communication with said memory management module;
a rule module in communication with said memory management module;
an incoming QOS module in communication with said memory management module;
a bin module in communication with said memory management module;
an output queue module in communication with said memory management module; and
a packet wrapping module in communication with said memory management module.

17. A system as recited in claim 16, wherein said rule module further comprises an interface, wherein said interface is configured to communicate with a rule memory.

18. A system as recited in claim 16, wherein said memory management module further comprises a memory interface, wherein said memory interface is configured to communicate with a memory.

19. A network functions module, said network functions module comprising:
at least one flow module;
at least one memory in communication with said at least one flow module;
a bridging and routing module in communication with said at least one flow module and said at least one memory, the bridging and routing module performs bridging of packets to a downstream flow module and routes the packets to and from a bus,
wherein said bridging and routing module comprises at least memory means for receiving a packet pointer for a packet selected from one of a plurality of sources,
wherein said network functions module is configured to implement flow control and quality of service functions on packets in a network and wherein the downstream flow module determines whether or not to wrap outgoing packets with control information.

20. A network functions module as recited in claim 19, wherein said at least one flow module further comprises:
an upstream flow module in communication with said bridging and routing module and said at least one memory; and
the downstream flow module in communication with said upstream flow module, said bridging and routing module, and said at least one memory,
wherein said upstream flow module is configured to receive packets and said downstream flow module is configured to transmit packets.

21. A network functions module as recited in claim 20, wherein said downstream flow module further comprises:
a memory management module;
a command module in communication with said memory management module;
a rule module in communication with said memory management module;
an incoming QOS module in communication with said memory management module;
a bin module in communication with said memory management module;
an output queue module in communication with said memory management module; and
a packet wrapping module in communication with said memory management module.

22. A system as recited in claim 21, wherein said memory management module further comprises a memory interface, wherein said memory interface is configured to communicate with a memory.

23. A system as recited in claim 21, wherein said rule module further comprises an interface, wherein said interface is configured to communicate with a rule memory.

24. A network functions module as recited in claim 19, wherein said at least one flow module further comprises a scalable architecture for packet shaping, said scalable architecture comprising:
 a packet processing module for receiving packets;
 a communication link in connection with said packet processing module;
 at least one per flow queue in communication with said communication link;
 at least one sorting bin in communication with said communication link;
 an output queue in communication with said communication link; and
 a token recovery module in communication with said packet processing module and said output queue.

25. A network functions module as recited in claim 24, said network functions module further comprising:
 a plurality of said scalable architectures for packet shaping;
 a priority encoder in communication with the output queue of each of said plurality of scalable architectures for packet shaping; and
 a final output queue in communication with said priority encoder,
 wherein each of said plurality of said scalable architectures for packet shaping is configured to receive incoming packets and conduct quality of service functions on the incoming packets before transmitting the incoming packets to the priority encoder.

26. A network functions module as recited in claim 25, wherein said priority encoder is configured to generate a priority for the packets traveling through the network functions module.

27. A network functions module as recited in claim 24, wherein said at least one sorting bin further comprises a plurality of individual sorting bins, wherein each of said individual sorting bins corresponds to a different class of flow.

28. A network functions module as recited in claim 27, wherein said at least one sorting bin further comprises:
 a timer module in communication with said packet processing module; and
 a scheduled bin in communication with said packet processing module,
 wherein said scheduled bin is configured to reduce jitter caused by said scalable architecture for packet shaping.

29. A method for processing, said method comprising the steps of:
 receiving a packet in a media access controller;
 transmitting the packet to a network functions module;
 providing quality of service for upstream packet flows in an upstream flow module;
 performing bridging of the packet to a downstream flow module and routing the packet to and from a bus in a bridging and routing module;
 implementing flow management and classification functions on the packet;
 wrapping an outgoing packet in a downstream flow module based on a determination of whether or not to wrap outgoing packets with control information; and
 forwarding the packet to an appropriate destination.

30. A method for processing as recited in claim 29, wherein said step of implementing flow management functions further comprises the step of implementing at least one of traffic policing, rate shaping, and scheduling.

31. A method for processing as recited in claim 29, wherein said step of implementing flow management functions further comprises implementing a modified leaky bucket implementation.

32. A method for processing as recited in claim 31, wherein said step of implementing a modified leaky bucket implementation further comprises the steps of:
 receiving incoming packets in at least one scalable fair leaky bucket configuration;
 transmitting an output of each of the at least one scalable fair leaky bucket configurations to a priority encoder for prioritization; and
 receiving prioritized packets at a final output queue.

33. A method for processing as recited in claim 32, wherein said step of receiving incoming packets in at least one scalable fair leaky bucket configuration further comprises:
 receiving an individual incoming packet in a packet processing module of an individual scalable fair leaky bucket configuration;
 transmitting the individual packet to at least one of a plurality of per flow queues and a plurality of sorting bins for packet shaping in accordance with a predetermined algorithm; and
 transmitting a shaped packet to an individual output queue.

34. A method for processing as recited in claim 33, wherein said method further comprises the step of providing a token recovery module for tracking packet flow through the plurality of per flow queues and the plurality of sorting bins.

35. A method for processing as recited in claim 33, wherein said step of transmitting the individual packet to at least one of a plurality of per flow queues and a plurality of sorting bins further comprises the steps of using the plurality of per flow queues to queue packets for rate shaping and using the plurality of sorting bins to delay packet flow in accordance with a predetermined algorithm.

36. A method for processing as recited in claim 29, wherein said step of forwarding the packets to appropriate destinations further comprises the steps of:
 receiving a packet pointer;
 determining a cable modem identification;
 generating a pointer to forwarding rules;
 comparing the pointer to the forwarding rules in order to determine a match;
 extracting predetermined parameters from the match; and
 forwarding the packet in accordance with the predetermined parameters extracted.

37. A method for processing packets as recited in claim 36, wherein the predetermined parameters are a payload header suppression index and a service flow identification.

38. A method for processing packets as recited in claim 29, wherein said implementing step further comprises the steps of:
 determining a cable modem identification;
 storing the cable modem identification in a content addressable memory; and
 retrieving predetermined rules corresponding to the packet in accordance with the cable modem identification.

39. A method for processing packets as recited in claim 38, wherein said storing step further comprises attaching the cable modem identification to at least one address associated with the cable modem identification.

* * * * *